United States Patent
Kawano et al.

(10) Patent No.: US 9,688,410 B2
(45) Date of Patent: Jun. 27, 2017

(54) WATER INFLOW PREVENTION DEVICE FOR AIRCRAFT WORKING WHEN LANDING IN WATER, PRESSURE ADJUSTING VALVE, AND AIRCRAFT

(71) Applicant: Mitsubishi Aircraft Corporation, Aichi (JP)

(72) Inventors: Shingo Kawano, Tokyo (JP); Takashi Uchino, Tokyo (JP); Syuichi Hagino, Aichi (JP); Akitaka Urano, Akitaka (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 0 days.

(21) Appl. No.: 15/044,457

(22) Filed: Feb. 16, 2016

(65) Prior Publication Data
US 2016/0272334 A1    Sep. 22, 2016

(30) Foreign Application Priority Data
Mar. 19, 2015   (JP) ................. 2015-056007

(51) Int. Cl.
| | |
|---|---|
| *B64C 1/00* | (2006.01) |
| *B64D 25/00* | (2006.01) |
| *B64D 13/02* | (2006.01) |
| *F16K 17/36* | (2006.01) |
| *F16K 15/02* | (2006.01) |
| *F16K 15/03* | (2006.01) |

(52) U.S. Cl.
CPC ............. *B64D 25/00* (2013.01); *B64D 13/02* (2013.01); *F16K 15/023* (2013.01); *F16K 15/033* (2013.01); *F16K 15/035* (2013.01); *F16K 17/36* (2013.01); *B64C 2001/009* (2013.01)

(58) Field of Classification Search
CPC .. B64D 25/00; B64D 13/02; B64D 2001/009; F16K 31/22; F16K 31/30; F16K 31/001; F16K 31/13
See application file for complete search history.

(56) References Cited

U.S. PATENT DOCUMENTS

| | | | | |
|---|---|---|---|---|
| 2,598,274 A | * | 5/1952 | Krueger | F16K 17/0453 137/489 |
| 3,728,955 A | * | 4/1973 | Ricaud | B64D 13/02 454/71 |

(Continued)

FOREIGN PATENT DOCUMENTS

JP      2014-019174 A      2/2014

*Primary Examiner* — Philip J Bonzell
(74) *Attorney, Agent, or Firm* — Pearne & Gordon LLP

(57) ABSTRACT

The present invention provides a water inflow prevention device for aircraft, working when landing in water, the device including: a blocking body for blocking a flow channel from an outside of the aircraft when landing in water, the flow channel allowing the inside and outside of the aircraft to communicate with each other, and a valve element of a pressure adjusting valve being positioned in the flow channel; and a connection part that is deformed when landing in water, wherein the blocking body is supported by a member constituting an end of the flow channel on a side outside the aircraft through the connection part, and the connection part is deformed in a direction so as to block the flow channel by the blocking body, with use of force of water acting on the blocking body when landing in water.

16 Claims, 11 Drawing Sheets

(56) References Cited

U.S. PATENT DOCUMENTS

| | | | | |
|---|---|---|---|---|
| 4,463,774 A | * | 8/1984 | Gorges | B64C 1/1453 |
| | | | | 137/238 |
| 5,105,729 A | * | 4/1992 | Signoret | B64D 13/02 |
| | | | | 137/487.5 |
| 2013/0059518 A1 | * | 3/2013 | Biegemann | B64D 25/00 |
| | | | | 454/74 |
| 2014/0014195 A1 | | 1/2014 | Kawano | |

* cited by examiner

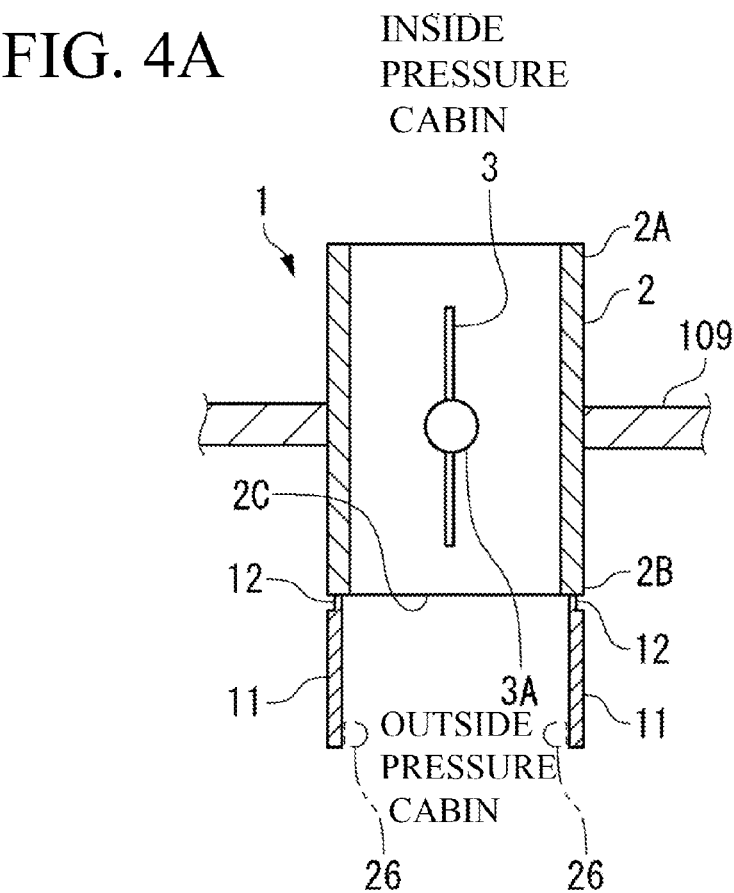
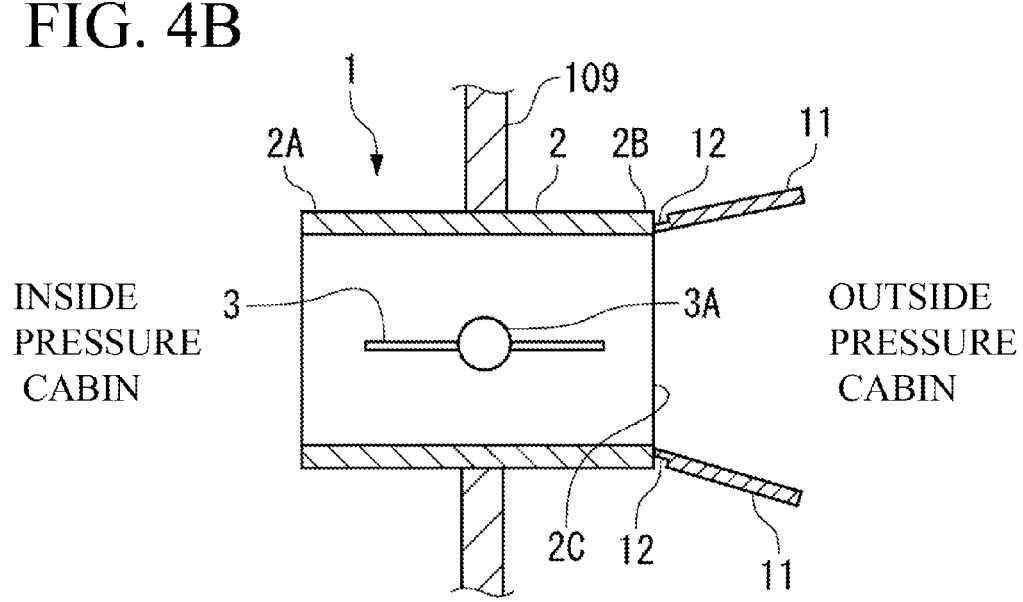

WATER INFLOW PREVENTION DEVICE FOR AIRCRAFT WORKING WHEN LANDING IN WATER, PRESSURE ADJUSTING VALVE, AND AIRCRAFT

BACKGROUND OF THE INVENTION

Field of the Invention

The present invention relates to a water inflow prevention device for aircraft working when landing in water, and a pressure adjusting valve including the device.

Description of the Related Art

An aircraft includes a pressure adjusting valve to adjust pressure in the aircraft during a flight by adjusting opening of the valve. The pressure adjusting valve is opened when the flight altitude is low. Thus, when an aircraft lands in the sea or a river in an emergency, water may enter the inside of the aircraft through the pressure adjusting valve.

At the time of an emergency landing in water, a pilot can perform an operation of closing the pressure adjusting valve. However, the pilot has other operations of higher priority to handle during an emergency.

Thus, there is proposed a device for preventing an inflow of water through a pressure adjusting valve at the time of an emergency landing in water even if no operation of closing the pressure adjusting valve is performed (refer to Japanese Patent Laid-Open No. 2014-19174). Japanese Patent Laid-Open No. 2014-19174 describes a pressure adjusting valve that is closed at the time of landing in water by using a lid with a float that floats in water, or an expanding object that expands when immersed in water.

Although a certain effect of preventing an inflow of water into the aircraft is expected by using a device described in Japanese Patent Laid-Open No. 2014-19174, higher reliability is required for aircraft, and thus it is desired to expand the use of means capable of more sufficiently preventing an inflow of water into aircraft as well as more reliably operating.

It is an object of the present invention to provide a water inflow prevention device for aircraft, capable of meeting such a request, and a pressure adjusting valve including the device.

SUMMARY OF THE INVENTION

A first aspect of the present invention is a device that prevents an inflow of water into an aircraft when the aircraft lands in water through a pressure adjusting valve of the aircraft that adjusts air pressure in the aircraft, and the device includes a blocking body that blocks a flow channel from the outside of the aircraft when landing in water. The flow channel allows the inside and outside of the aircraft to communicate with each other, and a valve element of the pressure adjusting valve is positioned in the flow channel.

In the present invention, the blocking body is supported by a member constituting an end of the flow channel on a side outside the aircraft through a connection part that is deformed when landing in water, and the connection part is deformed in a direction allowing the blocking body to block the flow channel by using force of water that tends to flow into the flow channel from a periphery of the flow channel, the force acting on the blocking body when landing in water.

A second aspect of the present invention is the blocking body that blocks the flow channel, in which the valve element of the pressure adjusting valve is positioned, from the outside of the aircraft when landing in water, and that is turnable with respect to the member constituting the end of the flow channel on the side outside the aircraft. In a normal period without landing in water, the blocking body is prevented from turning at least in a direction of the flow channel to be blocked.

The matter, "the blocking body is prevented from turning in a normal period", will be described below.

Although turning of the blocking body includes turning in a direction allowing the flow channel to be blocked, and that in the opposite direction, the blocking body is required not to turn at least in the direction allowing the flow channel to be blocked in a normal period. The blocking body sometimes does not turn in the direction allowing the flow channel to be blocked due to its self-weight depending on its posture. In that case, the self-weight of the blocking body prevents it from turning in the direction allowing the flow channel to be blocked.

As described above, it is desired not only to satisfy a request of preventing the blocking body from turning in the direction allowing the flow channel to be blocked, but also to prevent the blocking body from turning also in the opposite direction due to a flow of air and vibration of an airframe.

Thus, it is preferable to balance force turning the blocking body in the direction allowing the flow channel to be blocked with force (self-weight of the blocking body) turning the blocking body in the opposite direction to prevent the blocking body from turning in the opposite direction to the direction allowing the flow channel to be blocked in a normal period, in consideration of a direction allowing the self-weight of the blocking body to act.

It is preferable to adopt a regulation part that prevents the blocking body from turning in the direction allowing the flow channel to be blocked in a normal period, the regulation part including at least one of the following characteristics: (1) the part is dissolved in water to be broken; (2) the part is broken by water pressure; and (3) the part is extended by water pressure.

In addition, it is preferable that the water inflow prevention device of the second aspect of the present invention includes a pressing part that applies force to the blocking body in a predetermined turning direction, and a pressing regulation part that prevents the blocking body from turning by overcoming force of the pressing part, in a normal period.

Accordingly, force of the pressing part and restriction by the pressing regulation part enable the blocking body to be prevented from turning in both the direction allowing the flow channel to be blocked and the opposite direction in a normal period.

In a case where the pressing part presses the blocking body in the direction allowing the flow channel to be blocked, the pressing part removed from restriction by the pressing regulation part when landing in water turns the blocking body to enable the flow channel to be reliably blocked.

In the first and second aspects of the present invention, it is preferable that there is provided a plurality of blocking bodies each of which partially blocks the flow channel so that the plurality of blocking bodies blocks all of the flow channel.

A third aspect of the present invention is a device that prevents an inflow of water into an aircraft when the aircraft lands in water through a pressure adjusting valve of the aircraft that adjusts air pressure in the aircraft, and the device includes a blocking body that turns in a flow channel allowing the inside and outside of the aircraft to communicate with each other, in which a valve element of the pressure adjusting valve is positioned, to block the flow channel when landing in water, and a stopper that prevents the blocking body turned when landing in water from further turning.

Then, in the third aspect of the present invention, the blocking body is arranged in the flow channel along a horizontal direction, and is maintained at a posture inclined to the horizontal direction so that an end of the blocking body on a side outside the aircraft is positioned lower than an end thereof on a side inside the aircraft in a normal period without landing in water.

Here, "horizontal" in the present invention does not need to be strictly horizontal, and a slight deviation from the horizontal direction is allowable.

The pressure adjusting valve of the present invention includes the water inflow prevention device described above.

The aircraft of the present invention includes the pressure adjusting valve.

The water inflow prevention device of the present invention allows the blocking body to block the flow channel by using force of water that tries to flow into the flow channel, caused by pressure difference between atmospheric pressure in the flow channel and water pressure around the flow channel. Accordingly, an inflow of water into the inside of the aircraft through the pressure adjusting valve can be prevented. Thereby, submersion inside the aircraft can be delayed and this enables passengers and crews to have a necessary time to escape outside the aircraft.

BRIEF DESCRIPTION OF THE DRAWINGS

FIG. 1B shows a range circled by a broken line in FIG. 1A;
FIGS. 4A and 4B are longitudinal sectional views each of which shows another variation of the first embodiment.

DETAILED DESCRIPTION OF THE PREFERRED EMBODIMENTS

Embodiments of the present invention will be described below with reference to accompanying drawings.

Figure 1A:
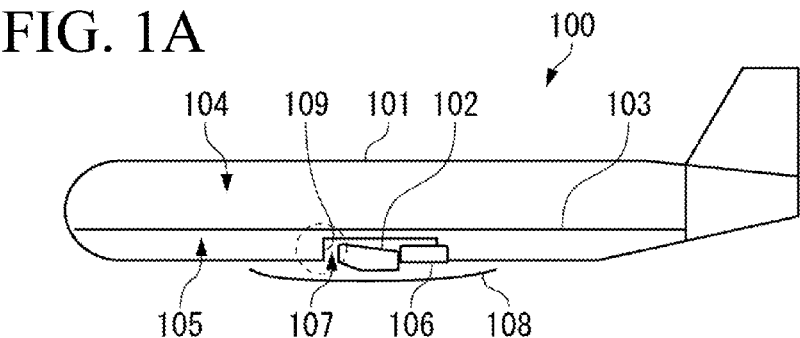
FIG. 1A shows an airframe of an aircraft.

A configuration of an aircraft 100 common to each of the embodiments will be briefly described with reference to FIG. 1A.

The aircraft 100 includes a fuselage 101, and a main wing 102.

A space 104 above a floor 103 installed inside the fuselage 101 (space above a floor) is divided into a cabin, a cockpit, a hold, and the like. The space 104 above the floor and a space 105 below the floor are pressurized by an air conditioning system (not shown) mounted in the aircraft.

The fuselage 101 is provided in its lower portion with a bay 107 in which various accessories, such as a main landing gear 106, are housed, as well as a central portion of the main wing 102 is arranged. The bay 107 is covered with a fairing 108. The inside of the fairing 108 is not pressurized. The inside and outside of the fairing 108 communicate with each other through an opening or a gap.

The bay 107 is divided by a pressure bulkhead 109 (refer to FIG. 1B) that separates a pressurized space inside the aircraft and an external space without being pressurized.

The aircraft 100 includes a pressure adjusting valve 1 (refer to FIG. 1B) that adjusts air pressure in the pressurized space inside the aircraft in a lower portion of the fuselage 101.

The air conditioning system performs air conditioning and pressurization inside the aircraft by using bleed air from an engine (not shown) of the aircraft as a heat source and a pressure source.

Figure 1B:
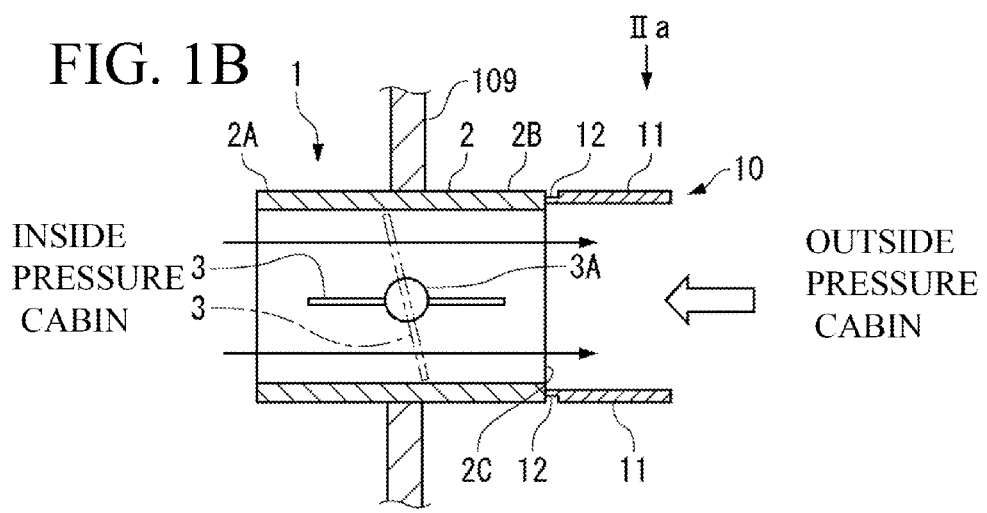
FIGS. 1B and 1C are longitudinal sectional views each of which shows a water inflow prevention device of a first embodiment, installed in a duct of a pressure adjusting valve provided in the airframe.

The air conditioning system adjusts opening of the pressure adjusting valve 1 to maintain the inside of the aircraft within a predetermined range of air pressure. As shown in FIG. 1B by thin arrows, air flows from the inside of the aircraft to the outside thereof through the pressure adjusting valve 1.

The pressure adjusting valve 1 includes a duct 2 in a cylindrical shape, allowing the inside of the pressure bulkhead 109 (the inside of the aircraft) and the outside thereof (the outside of the aircraft) to communicate with each other, and a valve element 3 arranged inside the duct 2. The duct 2 horizontally penetrates the pressure bulkhead 109 rising vertically.

The pressure adjusting valve 1 is a butterfly valve in which the valve element 3 turns around a shaft 3A to open and close the flow channel in the duct 2. When the valve element 3 is positioned as shown by a solid line, the pressure adjusting valve 1 is fully opened. The valve element 3 is driven to a position corresponding to opening of the pressure adjusting valve 1 (such as a position shown by a dashed line) by an actuator (not shown).

Various public known valves, such as a shutter valve, are available as the pressure adjusting valve 1.

The duct 2 can be determined in an appropriate shape. For example, an end 2A of the duct 2 inside the aircraft can be formed in a bell mouth shape.

To secure redundancy, a plurality of pressure adjusting valves 1 may be provided in the pressure bulkhead 109.

If the aircraft 100 lands in water in an emergency, the fairing 108 is broken due to a collision with a water surface to cause the lower portion of the fuselage 101 to be submerged.

Then, it is necessary to prevent the inside of the aircraft from being submerged by water flowing into the inside thereof through the pressure adjusting valve 1 as shown in FIG. 1B by an open arrow.

At the time, a pilot can perform an operation of closing the pressure adjusting valve 1, however, the operation may be delayed. If the aircraft 100 receives an impact before the emergency landing in water, a control system of the pressure adjusting valve 1 may break down to cause the valve element 3 to fail to operate even if the pilot performs the operation.

Each of the embodiments described below will describe a device capable of preventing an inflow of water into the inside of the aircraft through the pressure adjusting valve 1 even if the valve element 3 fails to operate due to a delay of the operation of closing the pressure adjusting valve 1 or a failure of the control system.

(First Embodiment)

Figure 1C:
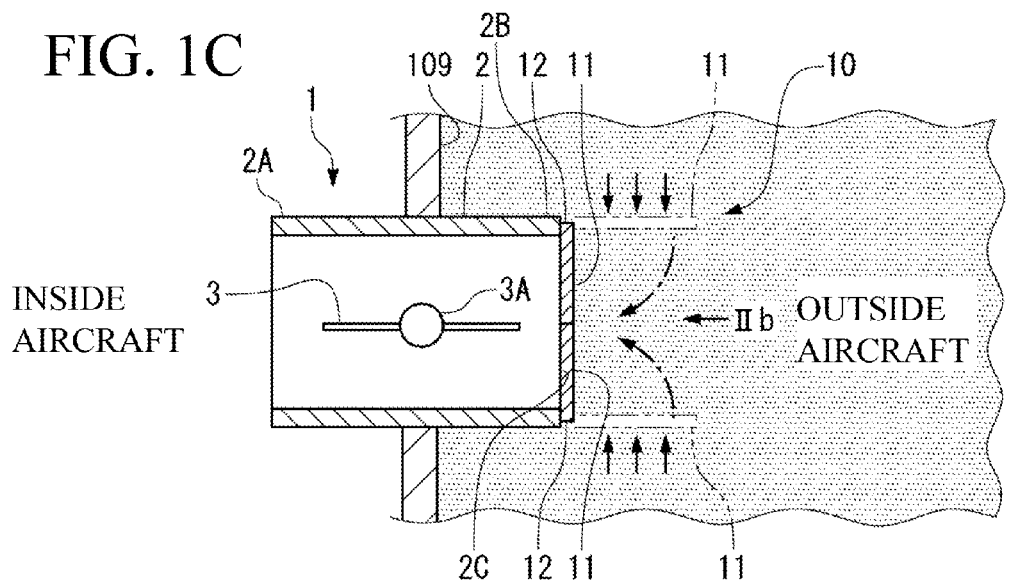

As shown in FIGS. 1B and 1C, a water inflow prevention device 10 in accordance with a first embodiment includes a pair of lids 11 provided at an end 2B of the duct 2, projecting outside the aircraft, and a connection part 12 that connects the lids 11 to the duct 2. The lids 11 are opened in a normal period without landing in water, as shown in FIG. 1B.

As shown in FIG. 1C, the water inflow prevention device 10 closes the lids 11 to block an opening 2C of the duct 2 when landing in water to prevent an inflow of water into the inside of the aircraft through the duct 2 of the pressure adjusting valve 1.

Figure 2A:
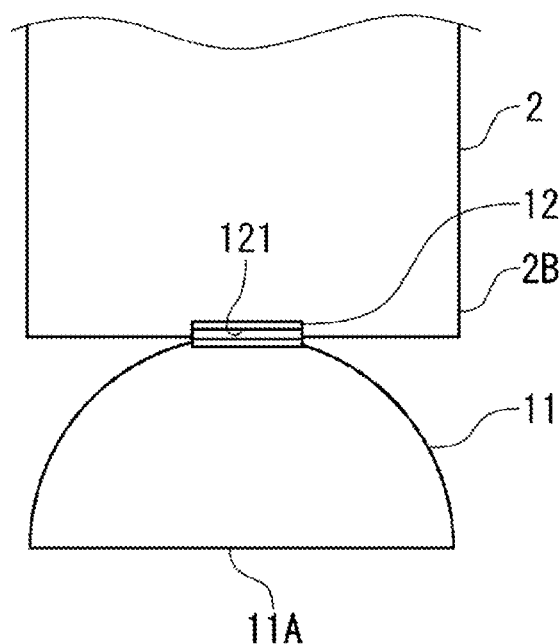
FIG. 2A shows the water inflow prevention device of FIG. 1B viewed from a direction of IIa.
Figure 2B:
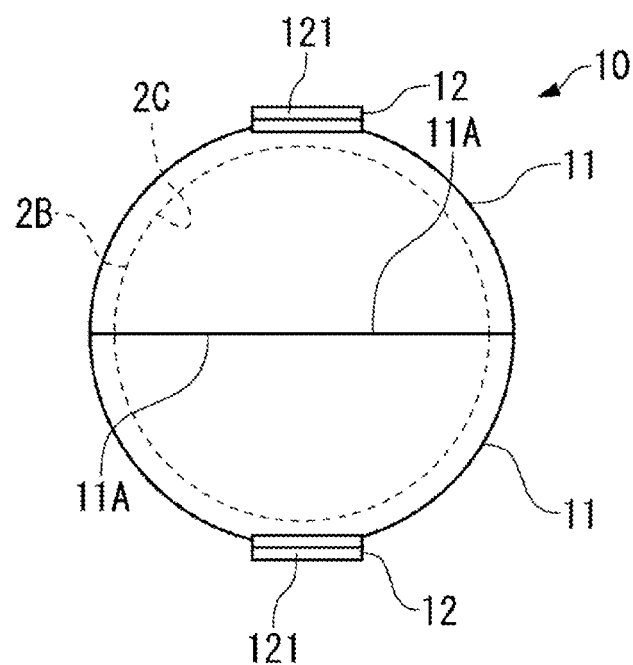
FIG. 2B shows the water inflow prevention device of FIG. 1C viewed from a direction of IIb.

Each of the lids 11 is formed in a semicircular plate shape as shown in FIGS. 2A and 2B. As shown in FIG. 2B, when the pair of lids 11 is closed, the circular opening 2C of the duct 2 is blocked. At this time, there may be a gap between an end 11A of one of the lids 11 and an end 11A of the other of the lids 11. The end 11A of one of the lids 11 and the end 11A of the other of the lids 11 may overlap with each other. The shape of the lid 11 is not limited to a semicircle, and may be a rectangle, for example. The lid 11 also may be determined in an appropriate shape that blocks the opening 2C of the duct 2.

The lid 11 is formed of appropriate material, such as metallic material such as aluminum alloy, fiber-reinforced resin, and resin material.

As shown in FIG. 1B, the respective lids 11 are supported at upper and lower ends of the duct 2 through the corresponding connection parts 12 in a normal period. At this time, the lids 11 are arranged parallel to an axis line of the duct 2.

The connection parts 12 are deformed when predetermined force is applied so that the lids 11 are closed as shown in FIG. 1C. In the present embodiment, the lid 11 and the connection part 12 are integrally formed of plate material, and a linear groove 121 (refer to FIG. 2A) is formed in a surface of the plate material. A thin portion remains on the opposite side of the plate material to the groove 121 corresponds to the connection part 12.

The duct 2 and the connection part 12 are joined to each other by an appropriate method such as fastening.

With reference to FIG. 1C, operation of the water inflow prevention device 10 will be described.

When the lower portion of the fuselage 101 of the aircraft 100 lands in water, water reaches around the opening 2C of the duct 2 outside the aircraft. Then, water pressure is always more than atmospheric pressure in the duct 2, so that the water tries to flow into the duct 2 through around the opening 2C. When force of the water trying to flow into the duct 2 (shown by three parallel arrows in FIG. 1C) acts on the lid 11 to apply predetermined force or more to the connection part 12 connecting the lid 11 to the duct 2, the connection part 12 (thin portion) is deformed so as to bend along the groove 121. Accordingly, the lid 11 turns inward so as to block the opening 2C of the duct 2 (refer to an arrow by dashed lines).

The force of the water trying to flow into the duct 2 on the basis of pressure difference between atmospheric pressure and water pressure acts on both of the pair of lids 11. As a result, both of the connection parts 12 corresponding to the respective lids 11 are deformed. The lid 11 turning toward the opening 2C is pressed on an end face of the duct 2 by water pressure in accordance with a depth from a water surface. Accordingly, an inflow of water into the inside of the aircraft through the pressure adjusting valve 1 is prevented.

In the present specification, prevention of an inflow of water means not only that an inflow of water is completely prevented, but also that the amount of water is reduced even if there is an inflow of water.

Even if the space 105 below the floor is gradually submerged due to water flowing into the inside of the aircraft through portions other than the pressure adjusting valve 1, such as a part of the airframe broken at the time of an emergency landing in water, and a portion at which members are joined to each other, the water inflow prevention device 10 blocks the opening 2C of the duct 2 with a relatively large area to enable reducing a speed of submersion. As a result, it is possible to secure a necessary time to allow passengers and crews to escape outside the aircraft.

The water inflow prevention device 10 of the present embodiment only includes the lid 11 that closes the opening 2C of the duct 2 when landing in water, and the connection part 12 that connects the lid 11 to the duct 2, and that is deformed when landing in water, to enable preventing an inflow of water into the inside of the aircraft at the time of an emergency landing in water.

Thus, the water inflow prevention device 10 can be reduced in weight as compared with a configuration for the same purpose, including a sensor for detecting water around the pressure adjusting valve 1, an electromagnetic valve that blocks the opening 2C of the duct 2 by receiving a detection signal of water from the sensor, and wiring that connects the sensor and the electromagnetic valve to each other.

The water inflow prevention device 10 of the present embodiment also has a low possibility of breaking down even if receiving an impact, as compared with such an electrical device. As a result, the water inflow prevention device 10 can be reliably operated at the time of an emergency landing in water.

Using an electrical device requires regular maintenance in which repair or replacement may be performed. In contrast, once the water inflow prevention device 10 is provided in an airframe, the airframe as it is can reach the end of its life without requiring maintenance.

Figure 3A:
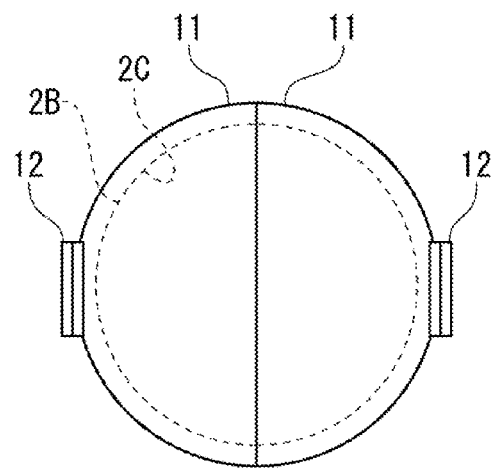
FIGS. 3A and 3B are longitudinal sectional views each of which shows a variation of the first embodiment.

The respective lids 11 of the water inflow prevention device 10 may be supported at right and left ends of the duct 2 facing the opening 2C as shown in FIG. 3A through the corresponding connection parts 12. Even in such a case, force of water trying to flow into the duct 2 through around the duct 2 acts on both of the pair of lids 11. Accordingly, the lids 11 are closed to block the opening 2C of the duct 2, as with the above.

Figure 3B:
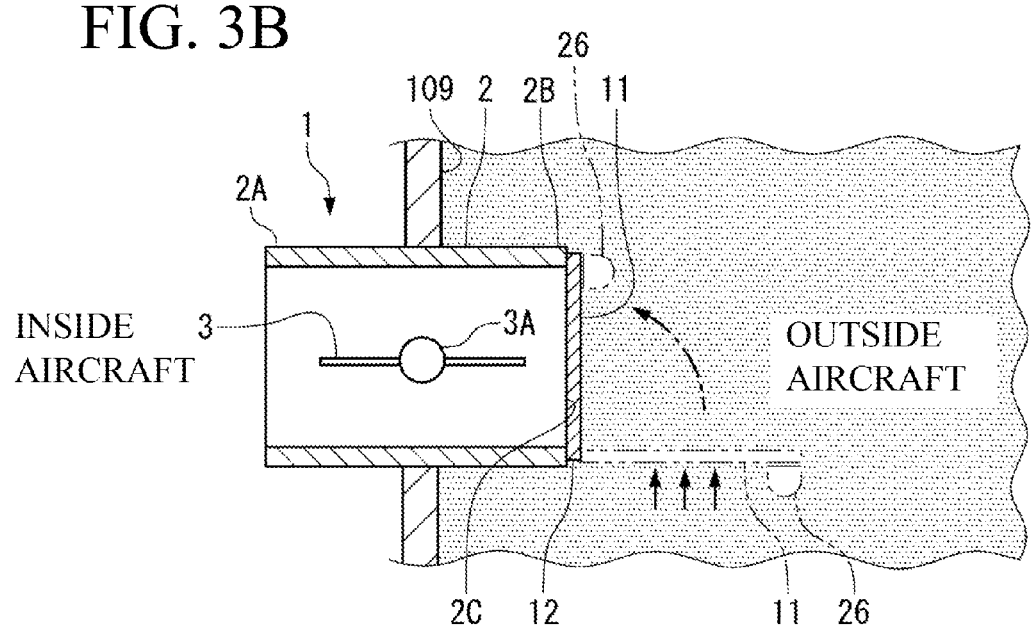

As shown in FIG. 3B, one lid 11 may block the opening 2C of the duct 2. The number of the lids 11 blocking the opening 2C is arbitrary, and three or more lids 11 may block the opening 2C.

Any position in a circumferential direction of the duct 2, at which the lid 11 is supported through the connection part 12, allows sufficient force for closing the lid 11 to act on the lid 11.

Behavior of the lid 11 is important to secure reliability of the aircraft 100 at the time of an emergency landing in water.

Thus, it is preferable to provide the lid 11 at a suitable position to allow the lid 11 to be rapidly and sufficiently closed in a steady manner on the basis of a landing-in-water test using a model of the aircraft 100, analysis, and the like.

Assuming that there is little flow of water around the opening 2C of the duct 2, as a way of thinking, pressure difference between atmospheric pressure in the duct 2 and water pressure increases as depth from a water surface increases, and thus force of water acting on the lid 11 provided at a lower end of the duct 2 is more than force of water acting on the lid 11 provided at an upper end of the duct 2. Thus, in a case where one lid 11 blocks the opening 2C, it is preferable to provide the lid 11 at the lower end of the duct 2.

In a case where a plurality of lids 11 blocks the opening 2C, even if movement of a part of the lids 11 is obstructed by an obstacle, such as a floating object under water, or a broken piece of the fairing 108, or a part of the lids 11 is broken by collision with an obstacle, other lid 11 is closed to enable reducing an inflow of water through the duct 2. As a result, submersion of the space 105 below the floor due to an inflow of water into the inside of the aircraft through the duct 2 can be delayed to enable securing a necessary time to escape outside the aircraft.

The present embodiment shows a position in the airframe at which the pressure adjusting valve 1 is provided, as only an example, and the pressure adjusting valve 1 can be provided in an appropriate partition wall that separates a pressurized space and an external space (such as a pressure bulkhead provided in a rear portion of the fuselage 101).

The water inflow prevention device 10 is capable of preventing an inflow of water into the inside of the aircraft through the duct 2 regardless of a direction of the duct 2 in which the water inflow prevention device 10 is provided.

In the present embodiments, the opening 2C of the duct 2 faces rearward (toward a tail assembly), but conversely, the opening 2C of the duct 2 may face frontward (toward a nose), upward, or downward as shown in FIG. 4A. In each case, as with the description above, the lid 11 is moved by force of the water trying to flow into the duct 2 on the basis of pressure difference between atmospheric pressure and water pressure to block the opening 2C to enable preventing an inflow of water into the inside of the aircraft.

The connection part 12 has a predetermined rigidity that allows a posture of the lid 11 to be maintained at an opened state without being deformed in a normal period, and that allows the connection part 12 to be deformed (without being broken) by receiving force of the water trying to flow into the duct 2 at the time of an emergency landing in water.

Selecting an appropriate material and thickness can apply an appropriate rigidity to the connection part 12.

The connection part 12 may be a member separated from the lid 11.

The posture of the lid 11 in a normal period is not necessarily parallel to the axis line of the duct 2, and may be inclined with respect to the axis line of the duct 2 so that the pair of lids 11 is widened from the end 2B of the duct 2, as shown in FIG. 4B. Even in that case, force of water based on pressure difference between atmospheric pressure and water pressure acts on the lid 11 to deform the connection part 12 to enable closing the lid 11.

The lid 11 may be inclined to a direction opposite to a direction shown in FIG. 4B so as to be in a slightly closed state.

(Second Embodiment)

Next, with reference to FIG. 5, a second embodiment of the present invention will be described.

A matter different from that of the first embodiment will be mainly described below.

Figure 5A:
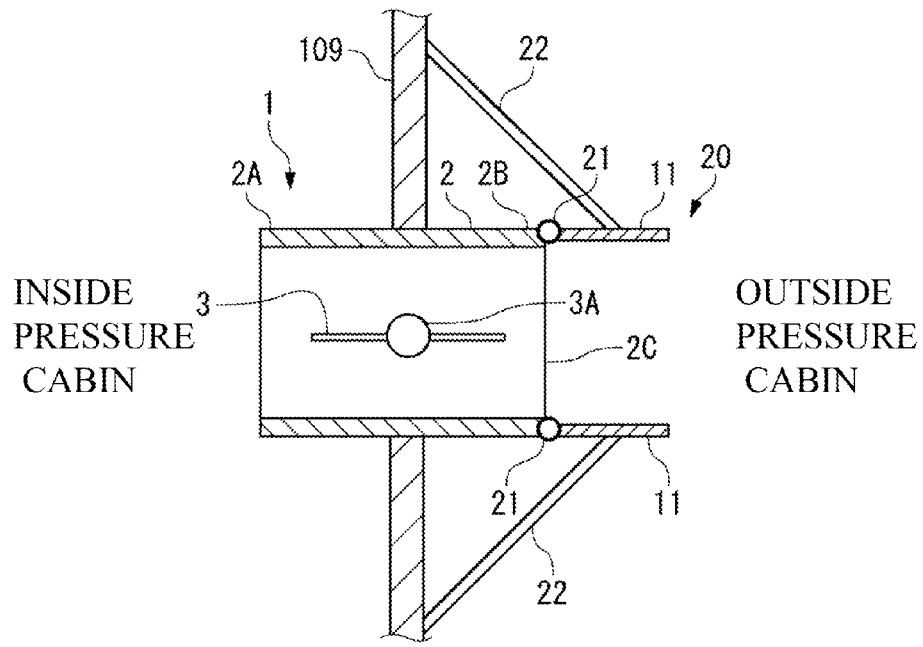
FIGS. 5A and 5B are longitudinal sectional views each of which shows a water inflow prevention device of a second embodiment.

As shown in FIG. 5A, a water inflow prevention device 20 of the second embodiment includes a pair of lids 11 that is rotatably connected to the end 2B of the duct 2 outside the aircraft by using a rotary shaft 21, and regulation parts 22 that prevent the respective pair of lids 11 from turning in a normal period.

The rotary shaft 21 is orthogonal to the axis line direction of the duct 2.

As shown in FIG. 5A, the lid 11 is opened in a normal period, and is removed from restriction by the regulation part 22 at the time of an emergency landing in water. Then, as shown in FIG. 5B, the lid 11 turns around the rotary shaft 21 by using force of water trying to flow into the duct 2 on the basis of pressure difference between atmospheric pressure in the duct 2 and water pressure to block the opening 2C of the duct 2.

An appropriate method of applying a degree of freedom of rotation to the lid 11 to block the opening 2C enables the lid 11 to be rotatably connected to the end 2B of the duct 2. For example, the lid 11 and the end 2B of the duct 2 can be connected to each other through a cord or the like.

The regulation part 22 couples a surface of the lid 11, and a surface of the pressure bulkhead 109, outside the aircraft, to each other at least in a normal period. The regulation part 22 also has rigidity required to prevent the lid 11 from turning in a normal period. In addition, the regulation part 22 includes at least one of the following characteristics to release restriction when landing in water: (1) the part is dissolved in water to be broken; (2) the part is broken by water pressure; and (3) the part is extended by water pressure. Specifically, a member containing cellulose (such as a cord made of paper), and an elastic body (such as a spring), are applicable as the regulation part 22.

Figure 5B:
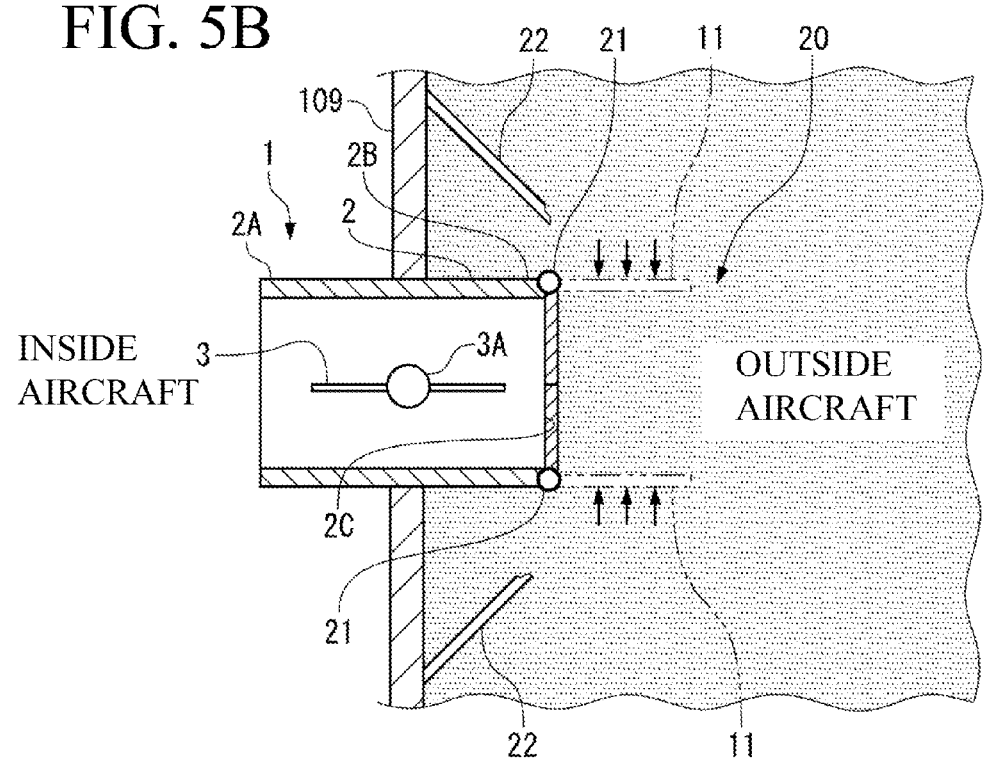

FIGS. 5A and 5B show an example that applies the regulation part 22 including the characteristic (1) or (2), described above.

The regulation part 22 including the characteristic (3) described above may use a spring that is deformed by water pressure, for example. The spring may be deformed in its plastic range exceeding its elastic range due to the water pressure.

Allowing dry air inside the aircraft flowing out through the duct 2 to flow around the regulation part 22 enables the regulation part 22 to be maintained in a dry state in a normal period. The bay 107, in which the regulation part 22 is positioned, is covered with the fairing 108 to prevent rain from falling on the regulation part 22.

As the regulation part 22, a member with softness (or flexibility) is applicable.

In a case where the lid 11 provided at the lower end of the duct 2 is coupled to the pressure bulkhead 109 by the regulation part 22 with softness, the lid 11 may turn in a direction in which the lid 11 is opened by its self-weight in a normal period. However, that is allowed because the lid 11 is not closed.

To allow the lid 11 not to be closed in a normal period, as well as to prevent the lid 11 from turning due to a flow of air in a periphery and vibration of an airframe, the regulation part 22 needs rigidity to stand by itself. For example, if a core material made of paper is used in the regulation part 22 to have rigidity to allow the regulation part 22 to stand by itself, the lid 11 is prevented from turning in both an opening direction and a closing direction. As a result, the lid 11 can be maintained at a predetermined posture (such as a posture along the axis line of the duct 2) in a normal period.

(Third Embodiment)

Figure 6:
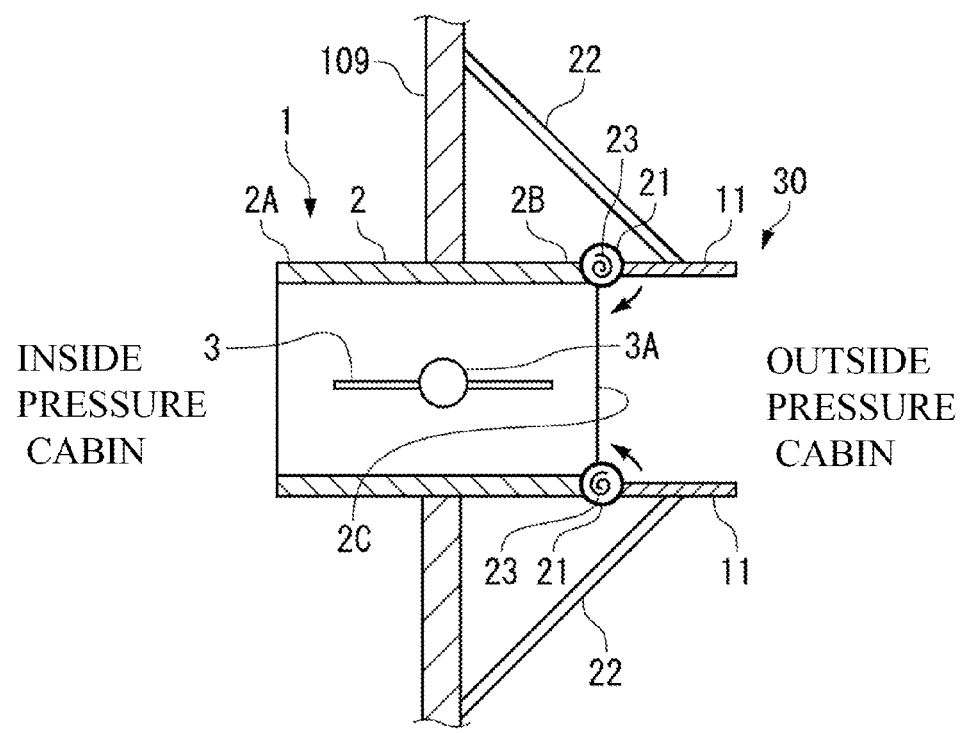
FIG. 6 is a longitudinal sectional view showing a water inflow prevention device of a third embodiment.

Subsequently, with reference to FIG. 6, a third embodiment of the present invention will be described.

A water inflow prevention device 30 of the third embodiment includes a spring 23 that presses the lid 11 in a closing direction (refer to arrows) in addition to the components (the pair of lids 11, the rotary shaft 21, and the regulation part 22) provided in the water inflow prevention device 20 of the second embodiment.

The spring 23 can be provided in the rotary shaft 21. A form of the spring 23 is not particularly limited. The same applies to a spring (refer to FIG. 7) described later.

The regulation part 22 (pressing regulation part) prevents the lid 11 from turning by overcoming elastic force of the spring 23 in a normal period to allow the lid 11 not to turn in both a closing direction and an opening direction.

Even if force in the opening direction is applied to the lid 11 due to a flow of air in a periphery and vibration of an airframe, the spring 23 prevents the lid 11 from turning. In addition, even if force in the closing direction is applied to the lid 11, the regulation part 22 prevents the lid 11 from turning.

If the regulation part 22 is broken or extended at the time of an emergency landing in water, the lid 11 is closed by elastic force of the spring 23 and force of water trying to flow into the duct 2 to block the opening 2C of the duct 2.

That is, the elastic force of the spring 23 in addition to the force of water acts on the lid 11. This enables the lid 11 to be more reliably closed at the time of an emergency landing in water.

In addition, if elastic force of the spring 23 is appropriately designed so as to allow the lid 11 to be closed under water even by force of the spring alone, the lid 11 can be closed in a steady manner even in a case where a wave or a swell causes force of water not to sufficiently act in a direction in which the lid 11 is closed.

(Fourth Embodiment)

Figure 7:
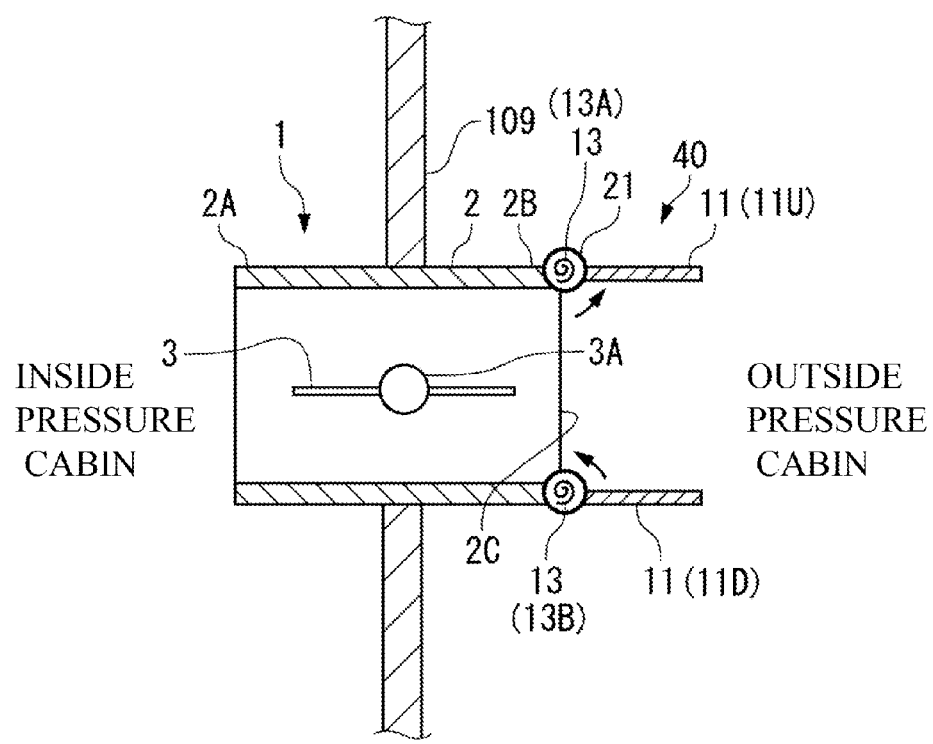
FIG. 7 is a longitudinal sectional view showing a water inflow prevention device of a fourth embodiment.

Subsequently, with reference to FIG. 7, a fourth embodiment of the present invention will be described.

A water inflow prevention device 40 of the fourth embodiment includes springs 13 each of which serves as a regulation part that prevents the lid 11 from turning by overcoming self-weight of the lid 11. The water inflow prevention device 40 does not include the regulation part 22 described above.

The respective springs 13 pressurize an upper lid 11 and a lower lid 11, provided in the duct 2, in respective arrow directions.

The upper lid 11 (11U) is prevented from turning in a closing direction by the spring 13 (13A). Self-weight of the upper lid 11U and elastic force of the spring 13A are balanced with each other to prevent the lid 11U from turning in the closing direction as well as in an opening direction.

The lower lid 11 (11D) is prevented from turning in an opening direction by the spring 13 (13B). Self-weight of the lower lid 11D and elastic force of the spring 13B are balanced with each other to prevent the lid 11D from turning in the opening direction as well as in a closing direction.

At the time of landing in water, the upper lid 11U is closed by force of water trying to flow into the duct 2 by overcoming the elastic force of the spring 13A, and the lower lid 11D is closed by the force of water trying to flow into the duct 2 by overcoming the self-weight of the lower lid 11D. Accordingly, the opening 2C of the duct 2 can be blocked.

Other than the regulation part 22 and the spring 13, described above, it is also possible to apply friction to movement of the rotary shaft 21 supporting the lid 11 to prevent the lid 11 from turning.

(Fifth Embodiment)

Figure 8:
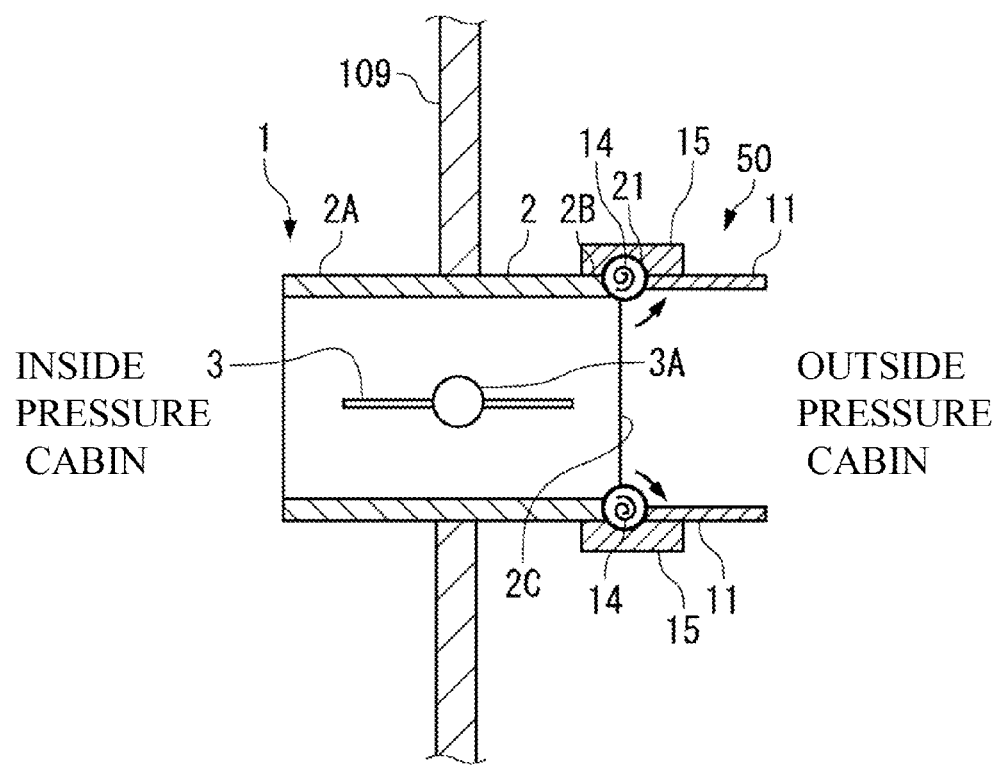
FIG. 8 is a longitudinal sectional view showing a water inflow prevention device of a fifth embodiment.

Subsequently, with reference to FIG. 8, a fifth embodiment of the present invention will be described.

A water inflow prevention device 50 of the fifth embodiment includes pressure springs 14 (pressing parts) that pressurize the respective pair of lids 11 in opening directions, and stoppers 15 (pressing regulation parts) each of which prevents the lid 11 from turning by overcoming pressing of the spring 14. The pressing of the spring 14 and restriction of the stopper 15 prevents the lid 11 from turning in a closing direction as well as in the opening direction.

When landing in water, the lid 11 is closed by force of water trying to flow into the duct 2, and the opening 2C of the duct 2 is blocked accordingly.

(Sixth Embodiment)

Subsequently, with reference to FIG. 9, a sixth embodiment of the present invention will be described.

A water inflow prevention device 60 of the sixth embodiment includes a blocking body 24 for blocking the opening 2C, outside the aircraft, of the duct 2 horizontally provided at the time of an emergency landing in water. The blocking body 24 is formed in a disk-like shape.

Figure 9:
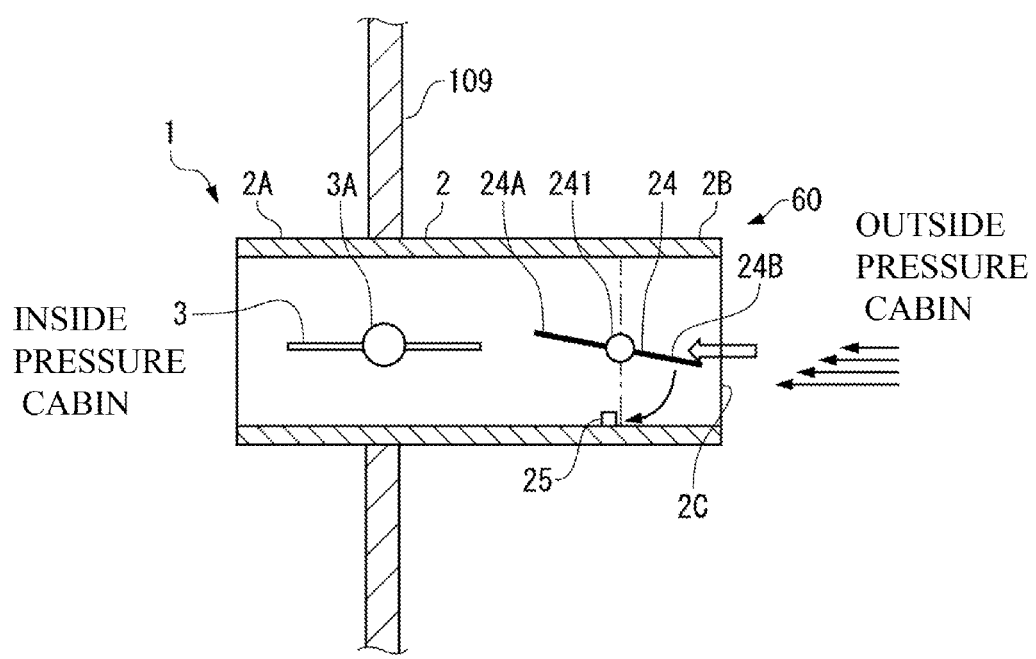
FIG. 9 is a longitudinal sectional view showing a water inflow prevention device of a sixth embodiment.

The blocking body 24 has the same structure as that of the valve element 3, i.e., a butterfly valve, provided in the pressure adjusting valve 1, and turns in a clockwise direction (arrow direction) in FIG. 9 around a shaft 241 provided horizontally along a diameter of the duct 2.

A stopper 25 is provided in an inner wall of the duct 2 to allow a turned end of the blocking body 24 to strike the stopper 25. The stopper 25 prevents the blocking body 24 from further turning.

The stopper 25 is enough to be provided at least at one place in a circumferential direction of the duct 2. An annular stopper 25 continuous in the circumferential direction also can be provided.

As shown in FIG. 9, the blocking body 24 is slightly inclined with respect to a horizontal direction in a normal period so that an end 24B on a side outside the aircraft is positioned lower than an end 24A on a side inside the aircraft. In a normal period, the blocking body 24 is maintained at this posture as it is. To prevent the blocking body 24 from turning clockwise or counterclockwise in FIG. 9 from the posture, a spring is available, for example.

When landing in water, first a lower portion of the fuselage 101 is submerged. Accordingly, water trying to flow into the duct 2 due to pressure difference between atmospheric pressure and water pressure reaches a surface of the end 24B of the blocking body 24 arranged at an angle, the end 24B being positioned on the side outside the aircraft as well as on a lower side (refer to an open arrow). Then, force of the water is applied to the blocking body 24, and turns it in an arrow direction to allow the blocking body 24 to be locked by the stopper 25 in a posture along a vertical direction, as shown by a dashed line.

The blocking body 24 is maintained at the posture as it is by water pressure. As four arrows show distribution of water pressure, the water pressure increases as depth from a water surface increases, and thus the water pressure acts in a direction allowing the blocking body 24 to be turned clockwise. As a result, it is possible to maintain a state where the opening 2C of the duct 2 is blocked.

Even in a case where the blocking body 24 is provided closer to the inside of the aircraft than the valve element 3, the blocking body 24 operates as with the description above to enable the flow channel of the duct 2 to be blocked.

Other than the above, it is possible to select from the configurations shown in the embodiments above, and to appropriately modify them into another configuration, within a range without departing from the essence of the present invention.

For example, as shown in FIGS. 3B and 4A by a two-dot chain line, attaching a float 26, which floats under water, to the lid 11 enables assisting operation of the lid 11 at the time of an emergency landing in water. As the float 26, an appropriate form with specific gravity smaller than water, such as a hollow capsule, is available.

Providing a seal for sealing a gap between the lid 11 blocking the opening 2C of the duct 2 and an end face of the duct 2 to the lid 11 or the end face of the duct 2 can contribute to reducing the amount of water flowing into the inside of the aircraft through the duct 2.

Figure 10:
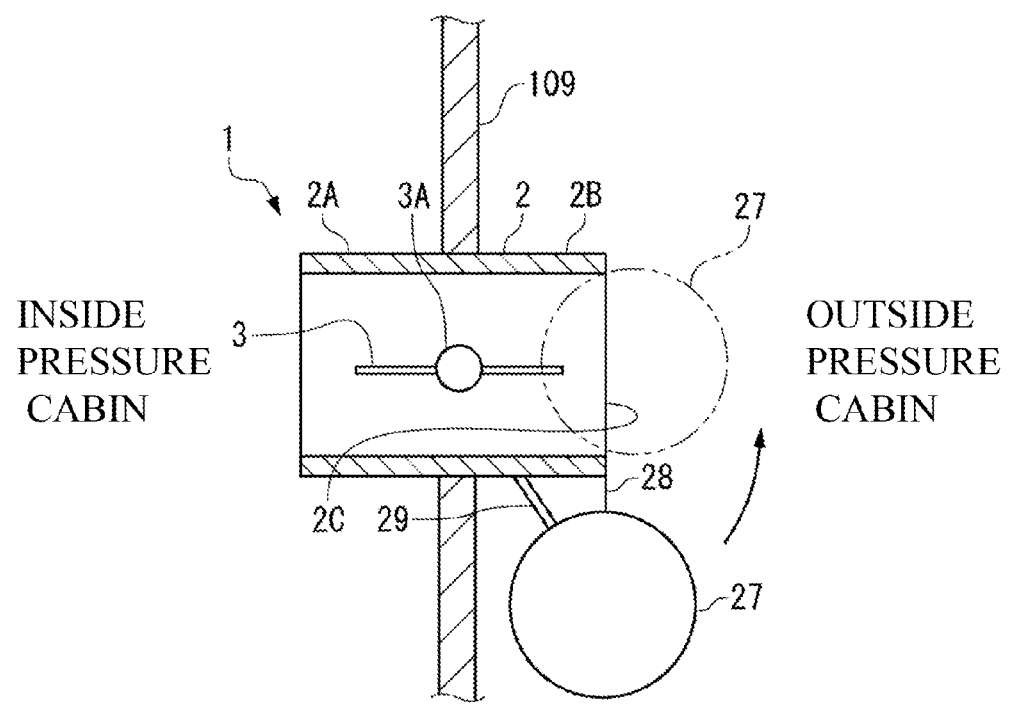
FIG. 10 is a longitudinal sectional view showing a variation of the second embodiment.

FIG. 10 shows an example using a spherical float 27 instead of the plate-shaped lid 11 of the second embodiment.

The float 27 is suspended from a lower end of the duct 2 by a cord 28, as well as is prevented from turning in a direction allowing the opening 2C to be blocked in a normal period by a regulation part 29 that couples an outer periphery portion of the duct 2 and the float 27 to each other. The regulation part 29 may couple the float 27 and the pressure bulkhead 109 to each other.

The float 27 has a diameter more than a diameter of the opening 2C of the duct 2.

Once the regulation part 29 is broken or extended by being immersed in water due to landing in water of the aircraft, the float 27 is turned in an arrow direction by force of water trying to flow into the duct 2 and buoyancy acting on the float 27. Accordingly, the opening 2C is blocked by the float 27 (shown by a two-dot chain line).

Figure 11:
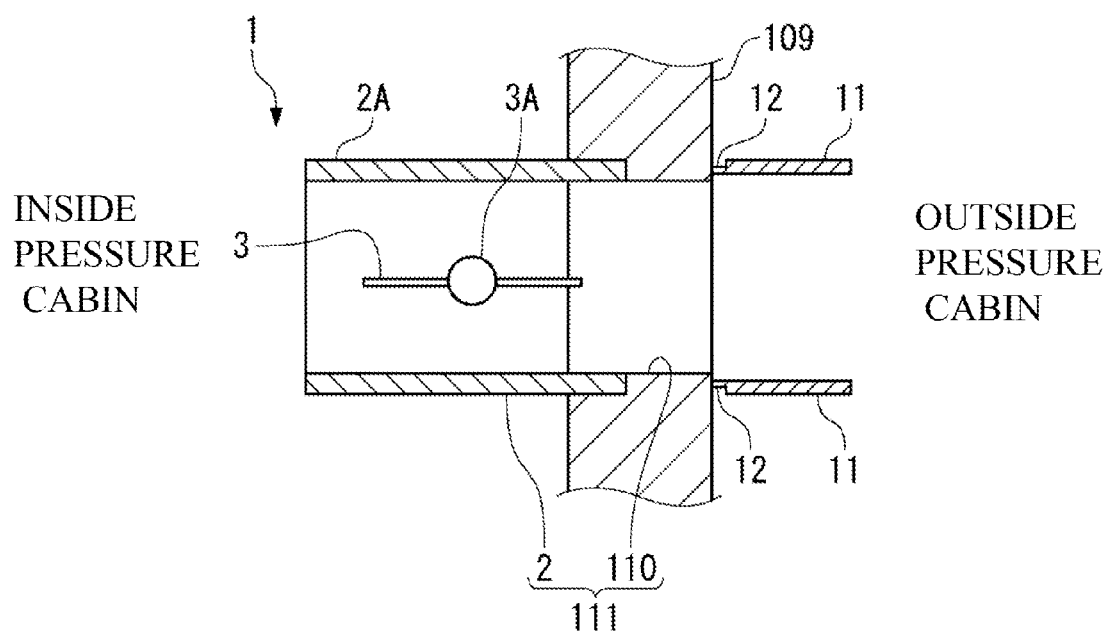
FIG. 11 is a longitudinal sectional view showing a variation of the present invention.

Unlike each of the embodiments above, as shown in FIG. 11, the duct 2 is sometimes not projected to the outside of the aircraft across the pressure bulkhead 109. In an example of FIG. 11, the duct 2 is connected to a ventilation opening 110 formed in the pressure bulkhead 109 from the inside of the aircraft. In this example, the duct 2 and the ventilation opening 110 allow the inside and outside of the aircraft to communicate with each other to form a flow channel 111 in which the valve element 3 of the pressure adjusting valve 1 is positioned.

In that case, the lid 11 can be provided in the pressure bulkhead 109 that is a member constituting an end of the flow channel 111 on a side outside the aircraft.

The water inflow prevention device described in each of the embodiments above is also widely applicable to a valve and an opening, into which water may flow when an aircraft lands in water, other than the pressure adjusting valve.

What is claimed is:

1. A water inflow prevention device for aircraft that prevents an inflow of water into an aircraft when the aircraft lands in water through a pressure adjusting valve of the aircraft that adjusts air pressure in the aircraft, the water inflow prevention device comprising:
a blocking body that is configured to block a flow channel from an outside of the aircraft when landing in water, the flow channel allowing the inside and outside of the aircraft to communicate with each other, and a valve element of the pressure adjusting valve being positioned in the flow channel; and
a connection part that is configured to be deformed when landing in water,
wherein the blocking body is configured to be supported by a member constituting an end of the flow channel on a side outside the aircraft through the connection part, and the connection part is configured to be deformed in a direction so as to block the flow channel by the blocking body, with use of force of water acting on the blocking body when landing in water, the water trying to flow into the flow channel through around the flow channel.

2. The water inflow prevention device according to claim 1, wherein the blocking body is composed of a plurality of blocking bodies each of which partially blocks the flow channel, the plurality of the blocking bodies blocking all of the flow channel.

3. The water inflow prevention device according to claim 1, wherein the blocking body and the connection part are integrally formed.

4. The water inflow prevention device according to claim 1, wherein the blocking body and the connection part are integrally formed of a plate material.

5. A pressure adjusting valve comprising the water inflow prevention device according to claim 1.

6. An aircraft comprising the water inflow prevention device according to claim 1.

7. A water inflow prevention device for aircraft that prevents an inflow of water into an aircraft when the aircraft lands in water through a pressure adjusting valve of the aircraft that adjusts air pressure in the aircraft, the water inflow prevention device comprising:
a blocking body that is configured to block a flow channel from the outside of the aircraft when landing in water, the flow channel allowing the inside and outside of the aircraft to communicate with each other, and a valve element of the pressure adjusting valve being positioned in the flow channel;
wherein a force of the water caused by a difference in a pressure inside the flow channel and a pressure of the water around the flow channel turns the blocking body with respect to a member constituting an end of the flow channel on the side outside the aircraft, and the blocking body is prevented from turning at least in a direction allowing the flow channel to be blocked in a normal period without landing in water.

8. The water inflow prevention device according to claim 7, further comprising:
a regulation part that is configured to prevent the blocking body from turning in the direction allowing the flow channel to be blocked in the normal period,
wherein the regulation part has at least one of the following characteristics:
(1) the part is dissolved in water to be broken;
(2) the part is broken by water pressure; and
(3) the part is extended by water pressure.

9. The water inflow prevention device according to claim 7, further comprising:
a pressing part that is configured to apply force to the blocking body in a predetermined turning direction; and
a pressing regulation part that is configured to prevent the blocking body from turning by overcoming force of the pressing part, in the normal period.

10. The water inflow prevention device according to claim 7, wherein the blocking body is composed of a plurality of blocking bodies each of which partially blocks the flow channel, the plurality of the blocking bodies blocking all of the flow channel.

11. A pressure adjusting valve comprising the water inflow prevention device according to claim 7.

12. An aircraft comprising the water inflow prevention device according to claim 7.

13. A water inflow prevention device for aircraft that prevents an inflow of water into an aircraft when the aircraft lands in water through a pressure adjusting valve of the aircraft that adjusts air pressure in the aircraft, the water inflow prevention device comprising:
- a blocking body that is configured to turn to block a flow channel when landing in water, the flow channel allowing the inside and outside of the aircraft to communicate with each other, and a valve element of the pressure adjusting valve being positioned in the flow channel; and
- a stopper that is configured to prevent the blocking body turned when landing in water from further turning,
- wherein the blocking body is arranged in the flow channel along a horizontal direction, and is maintained at a posture inclined to the horizontal direction so that an end of the blocking body on a side outside the aircraft is positioned lower than an end of the blocking body on a side inside the aircraft in a normal period without landing in water.

14. The water inflow prevention device according to claim 13, wherein the blocking body is a butterfly valve.

15. A pressure adjusting valve comprising the water inflow prevention device according to claim 13.

16. An aircraft comprising the water inflow prevention device according to claim 13.

* * * * *